UNITED STATES PATENT OFFICE.

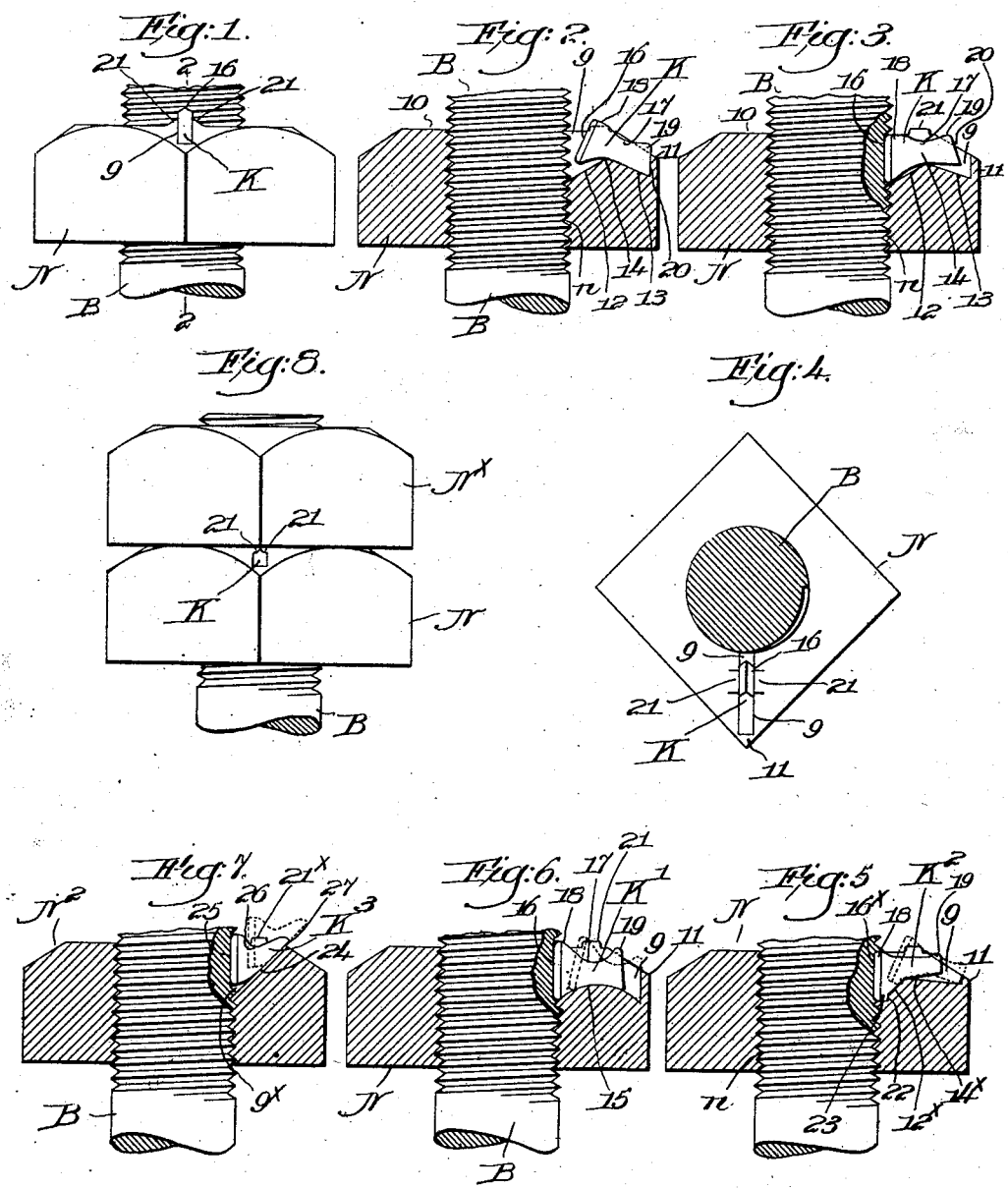

CLARENCE H. JOHNSON, OF BEVERLY, MASSACHUSETTS, ASSIGNOR TO BURROWS LOCK NUT & BOLT COMPANY, OF WEST GLOUCESTER, MASSACHUSETTS, A CORPORATION OF MASSACHUSETTS.

NUT-LOCK.

973,665.  Specification of Letters Patent.  Patented Oct. 25, 1910.

Application filed October 16, 1909. Serial No. 522,916.

*To all whom it may concern:*

Be it known that I, CLARENCE H. JOHNSON, a citizen of the United States, and resident of Beverly, county of Essex, State of Massachusetts, have invented an Improvement in Nut-Locks, of which the following description, in connection with the accompanying drawing, is a specification, like characters on the drawing representing like parts.

This invention has for its object the production of a novel and effective nut-lock, so constructed and arranged that it can be manufactured at low cost on a commercial scale, and which can be easily and quickly locked and unlocked upon the bolt.

My invention belongs to the general type of nut-locks wherein the nut is provided with a recess communicating with the bore of the nut, the locking key which is to coöperate with the bolt being seated in the recess.

I have so constructed the nut-lock in which my invention is embodied that the locking key is free to engage the bolt with any desired degree of firmness, and when unlocked there will be ample clearance between the threads of the bolt and the edge of the key arranged to coöperate therewith.

Heretofore it has been difficult to effect a positive locking action while at the same time providing sufficient clearance when the nut is unlocked, in one and the same device, while maintaining the simplicity of construction requisite for such devices to be manufactured economically.

Objections such as referred to have been overcome in my improved nut-lock, the novel features of construction thereof being fully described in the subjoined specification and particularly pointed out in the following claims.

Figure 1 is a side elevation of a bolt and nut-lock thereon embodying one form of my invention, but not locked in place; Fig. 2 is a vertical section on the line 2—2, Fig. 1, the bolt being shown in elevation; Fig. 3 is a similar view but showing the nut locked in position upon the bolt, the latter being partly in section to more clearly illustrate the coöperation of the key therewith; Fig. 4 is a top plan view of the device shown in Figs. 1 and 2; Figs. 5, 6 and 7 are views similar to Fig. 3 of modified forms of my invention, to be referred to in detail; Fig. 8 is a view in elevation showing one mode of locking the nut upon the bolt, to be explained.

In the drawing B is a bolt of any usual or suitable construction, and N is a nut adapted to be applied to the bolt, the nut having the usual threaded bore n by which it is screwed onto the bolt. The nut has a key-receiving recess 9, herein shown radial to the bore and intersecting the same, this recess being formed in any suitable manner, preferably by punching into the body of the nut from one of its faces, as 10, and it will be noted that the recess does not extend to the other side of the nut, but as shown in Figs. 2 to 6, the outer end of the recess is closed, at 11. Said figures also clearly show the communication between the bore of the nut and the recess at its inner end. In order to attain the requisite freedom of movement of the locking key in such recess, to provide for a firm and positive engagement of the key and the thread of the bolt, and also to provide the desired clearance when the key is retracted, I have provided for a sliding movement of the key upon and with relation to the bottom of the recess, and also for a tipping movement. The smooth and parallel sides of the recess guide the key and prevent lateral displacement thereof, and the forward or inner edge of said key is sharpened to form an edge which will enter the bore of the nut and penetrate or cut into the thread of the bolt.

Having reference to Figs. 2 and 3 the bottom of the recess 9 is inclined toward each end thereof, as at 12, 13, from an intermediate high point or apex 14, making the bottom of the recess longitudinally convex, broadly speaking, and as shown in Fig. 6 the bottom is continuously curved from end to end, at 15.

The locking key K is located in the recess 9 and is movable bodily therein, the thickness of the key being such as to permit its free movement within said recess without any undue lateral play, the forward or inner edge of said key being straight from top to bottom and beveled to form a central, sharp, penetrating or cutting edge 16. At its top the key has a depression 17, leaving upwardly extended portions 18, 19 adjacent the cutting or penetrating edge and the outer edge 20, respectively, and as shown herein the edges 16 and 20 are upwardly converging. The bottom of the key conforms in general to the contour of the bottom of the recess 9, and hence is longitudinally concave, but such concavity is shallow, as will be apparent. By this construction I am able to extend the cutting edge 16 and also to elevate one or the other of the parts 18, 19 according to the position of the key, see Figs. 2 and 3. When the key is retracted to unlocked position, Fig. 2, it is supported upon the outward incline 13 of the recess bottom, so that the part 18 is elevated above the face 10 of the nut, the key sliding outward into the position shown and thereby ample clearance is provided between the bolt and the penetrating edge 16.

To lock the nut in position on the bolt the key is pushed inward longitudinally of the recess, and it thereby is caused to slide freely along the incline 13 and to tip upon the apex 14 and downward toward the bolt, thereafter sliding forward along the incline 12 as the edge 16 is brought into engagement with the bolt thread, the locking engagement therewith being effected by the application of pressure to the part 18. When the nut is locked the parts assume the position shown in Fig. 3, and thereupon two retaining lips 21, formed on the face 10 of the nut at opposite sides of the open top of recess 9, are forced down, by a hammer blow or otherwise, into the depression 17, retaining the key in locked position. When so positioned the part 19 at the outer end of the key is accessible from the face of the nut, to be struck by a tool when it is desired to release the nut, and when so struck the key will first tilt or tip on the apex 14 and spread apart the lips 21, and then it will slide outward away from the bolt, leaving the nut free to be turned thereupon. The nut can be locked when used in places where a hammer or a special tool cannot be used upon the key, as shown in Fig. 8, wherein a second nut $N^x$ is screwed onto the bolt after the nut N is seated in its proper position. The bottom face of nut $N^x$ engages the part 18 of the key and forces its edge 16 into locking engagement with the bolt, and as nut $N^x$ is further turned the lips 21 will be upset and forced over into the depression 17 to hold the key in locked position, after which the nut $N^x$ is unscrewed from the bolt.

It will be seen, from an inspection of Fig. 3, that when the key is in locking position the depression 17 is below the face 10 of the nut, so that a thorough holding engagement of the upset lips 21 with the key can be effected.

The key K' in Fig. 6 is shown by full lines in locking position, and in unlocked position by the dotted lines, the general structure of the key being substantially as described, except that its bottom is concaved to the same radius as the convex bottom 15 of the recess. The tipping of the key in this form is gradual and contemporaneous with the sliding movement, but as will be apparent the operations of locking and unlocking are the same as described in connection with the form of my invention illustrated in Figs. 1–4.

In Fig. 5 the incline $12^x$ adjacent the bore of the nut is provided at its lower end with a socket 22, and the forward end of the key $K^2$ at the bottom has a projection 23 to enter the socket when the key is in locking position, as shown in full lines. Such coöperation of the projection and socket holds the key in position and prevents its disengagement from the bolt by tipping upon the apex $14^x$ on the bottom of the recess 9, but it will be seen that when the key is retracted there is ample clearance between its cutting edge $16^x$ and the bolt.

Referring to Fig. 7 the bottom 24 of the recess $9^x$ is inclined toward the bore of the nut $N^2$, and the key $K^3$ is substantially triangular in shape, its straight, forward edge 25 being sharpened to penetrate the bolt thread, while its top has a depression 26 to receive the retaining lips $21^x$ when upset to hold the key in locked position. The key slides up or down the inclined bottom 24, out of or into operating position, and can be tipped upon the apex 27 and withdrawn from the recess.

From the foregoing description, in connection with the drawings, it will be manifest that in my present invention the locking key has a free sliding movement upon and is supported by the bottom of the recess in the nut, and that by virtue of this sliding motion and the tipping of the key the latter can be brought into the firmest possible engagement with the bolt, and when the key is retracted ample clearance is provided between the bolt and the cutting edge of said key.

The parts of the nut-lock are simple in construction and can be made economically and easily, while the operations of locking and unlocking can be performed readily and without the use of special tools.

Various changes or modifications may be made by those skilled in the art without departing from the spirit and scope of my invention.

Having fully described my invention, what I claim as new and desire to secure by Letters Patent is:—

1. In a nut-lock, in combination, a nut having a recess in communication with the bore of the nut, a key having a penetrating edge adapted to enter the bore, and means to support the key within the recess and impart a combined tipping and bodily sliding movement to the key when moved longitudinally of said recess.

2. In a nut-lock, in combination, a nut having the usual threaded bore and provided with a recess communicating with the bore and having smooth, parallel side walls to guide and prevent lateral displacement of the key, the bottom of the recess adjacent the bore being downwardly inclined toward the same, and a smooth-sided key within said recess and movable longitudinally therein between its side walls, said key having a sharpened edge adapted to enter the bore of the nut, the bottom of the key being supported by and sliding downward and inward upon the inclined bottom of the recess when said key is moved bodily inward longitudinally thereupon.

3. In a nut-lock, in combination, a nut having a threaded bore and provided in one face with a recess communicating with the bore and having smooth, parallel side walls to receive between them and guide the key, the bottom of the recess being inclined from a high point thereof downward and toward the bore adjacent thereto, to effect a downward movement of the key when the same is moved inward in the recess, and a key having smooth sides and a penetrating edge adapted to enter the bore and having its bottom conforming to the contour of the bottom of the recess, to rest and slide upon the bottom of the recess when moved longitudinally thereof, the sides of the key fitting snugly between the side walls of the recess and being held thereby from lateral movement.

4. In a nut-lock, in combination, a nut having a threaded bore and provided in one face with a recess communicating with the bore, and having smooth parallel walls at right angles to one face of the nut, a key having a penetrating edge adapted to enter the bore and provided with locking and releasing projections accessible above the top of the recess when said key is in unlocked or locked position, respectively, and means to impart a combined tipping and bodily sliding movement to said key when moved longitudinally of the recess upon the bottom thereof.

5. In a nut-lock, in combination, a nut having a threaded bore and provided in one face with a recess communicating with the bore, the bottom of the recess being downwardly inclined toward its opposite ends from an intermediate high point, and a key having an edge sharpened and adapted to enter the bore and concaved at its bottom to tip and slide upon the bottom of the recess.

6. A nut having a threaded bore and provided with a recess communicating therewith and having an open top, the bottom of the recess adjacent the bore being inclined toward it and having a socket, and a locking key seated in the recess and having a sharpened edge adapted to enter the bore, the bottom of the key resting and sliding upon the bottom of the recess, said key having a holding projection to enter the socket when the key is in locked position.

7. A nut having a threaded bore and provided in one face with a recess communicating with the bore, a key in the recess and having a sharpened edge adapted to enter the bore, the top of the key having a depression therein, and retaining lips normally extending upward from the top of the recess and being adapted to enter the depression in the key when the latter is in locking position.

8. A nut having a threaded bore and provided in one face with a recess communicating with the bore, a key having an edge sharpened and adapted to enter the bore, said key being movable longitudinally and bodily in the recess and having at its inner and outer ends upturned portions one or the other of which is always above and accessible at the face of the nut, upwardly projecting retaining lips on the nut adapted to engage the key between said upturned portions when the key is in locking position, and means to impart a tipping and sliding motion to the key when moved longitudinally of the recess.

9. In a nut-lock, a nut having a threaded bore and a communicating, radial recess in one face, the bottom of the recess adjacent its intersection with the bore inclining toward it, and a key provided with a cutting edge adapted to enter the bore, the bottom of the key engaging and conforming to the contour of the bottom of the recess, whereby the key has a sliding movement into and out of locking position, the key having an upwardly extended portion adjacent the cutting edge, projecting above the recess, said extended portion when engaged enabling the key to be moved into locking position.

10. In a nut-lock, in combination, a nut having a threaded bore and an intersecting key-recess having parallel side walls, a key bodily movable in said recess toward and from the bore and having a penetrating edge adapted to enter the bore, and coöperating portions of the key and recess supporting the key vertically between the side walls of the recess and imparting thereto a tipping and bodily sliding movement toward and from the bore of the nut when the key is moved into or out of locking position.

11. In a nut-lock, in combination, a nut having a threaded bore and an intersecting key-recess, a key bodily movable in said recess toward and from the bore and having a penetrating edge adapted to enter the bore, and coöperating portions of the key and recess supporting the key and imparting thereto a tipping and sliding movement toward and from the bore of the nut when the key is moved into or out of locking position, said key having a releasing projection on its top accessible at the face of the nut when the key is in locking position, to effect release of the key.

12. In nut-locks, a locking-key therefor, provided with flat sides, a concaved upper edge, a straight, forward cutting edge, and a longitudinally-concaved bottom edge the key being of greatest depth at its forward cutting edge.

13. A nut having a threaded bore and provided in its top face with a recess communicating with the bore, a key having an edge sharpened and adapted to enter the bore, said key being movable longitudinally and bodily within the recess into and out of locking position, and retaining lips adjacent the recess and normally projecting above the top face of the nut, to be turned over into engagement with the key when in locking position.

In testimony whereof, I have signed my name to this specification, in the presence of two subscribing witnesses.

CLARENCE H. JOHNSON.

Witnesses:
JOHN C. EDWARDS,
FREDERICK S. GREENLEAF.